(12) United States Patent
Gittere et al.

(10) Patent No.: US 11,498,504 B2
(45) Date of Patent: Nov. 15, 2022

(54) ROLL CAGE JOINING APPARATUS AND METHOD

(71) Applicant: JFG Products, LLC, Las Vegas, NV (US)

(72) Inventors: Carroll Roberts Gittere, Stanley, NC (US); Kristopher Wayne Higdon, Las Vegas, NV (US)

(73) Assignee: JFG Products, LLC, Las Vegas, NV (US)

( * ) Notice: Subject to any disclaimer, the term of this patent is extended or adjusted under 35 U.S.C. 154(b) by 420 days.

(21) Appl. No.: 16/836,905

(22) Filed: Mar. 31, 2020

(65) Prior Publication Data
US 2021/0300276 A1    Sep. 30, 2021

(51) Int. Cl.
*B62D 27/02* (2006.01)
*B60R 21/13* (2006.01)
*B62D 65/00* (2006.01)

(52) U.S. Cl.
CPC .............. *B60R 21/13* (2013.01); *B62D 27/02* (2013.01); *B62D 65/00* (2013.01)

(58) Field of Classification Search
CPC .... B62D 27/02; B62D 27/023; B62D 27/065; B62D 65/02
See application file for complete search history.

(56) References Cited

U.S. PATENT DOCUMENTS

| | | | | |
|---|---|---|---|---|
| 5,393,095 A | * | 2/1995 | Kreis | B62D 21/152 280/798 |
| 5,458,393 A | * | 10/1995 | Benedyk | B62D 27/023 280/798 |
| 5,720,511 A | * | 2/1998 | Benedyk | B62D 29/008 280/798 |
| 6,908,107 B2 | | 6/2005 | Barth | |
| 8,757,662 B2 | | 6/2014 | Deschambault | |
| 9,393,894 B2 | | 7/2016 | Steinmetz et al. | |
| 10,384,722 B2 | | 8/2019 | Leonard et al. | |
| 2004/0118647 A1 | * | 6/2004 | Wang | B60R 19/40 188/300 |
| 2004/0244172 A1 | * | 12/2004 | Elliott | B62D 27/026 29/445 |
| 2014/0049033 A1 | * | 2/2014 | Yee | B62D 27/065 280/797 |

(Continued)

FOREIGN PATENT DOCUMENTS

| | | |
|---|---|---|
| EP | 1370447 B1 | 12/2003 |
| KR | 20150142699 A | 12/2015 |
| WO | 2014160728 A2 | 10/2014 |

*Primary Examiner* — Toan C To
(74) *Attorney, Agent, or Firm* — Lowe Graham Jones PLLC

(57) ABSTRACT

A roll cage is formed by joining tubes using an intermediate member with shoulder portions that insert within the tubes. Two inserts secure within the tubes, at least one being threaded. A threaded bolt is inserted through a first insert, through the intermediate member, and threaded into the second insert. Other tubes secure to the intermediate member such that the tubes together form a roll cage that may be secured to the chassis of a vehicle. For multi-row vehicles, a third insert secures in the second tube and has a threaded shaft protruding from it. The threaded shaft is passed through a second intermediate member and threaded into a threaded insert in a third tube and the second tube is rotated.

20 Claims, 9 Drawing Sheets

(56) References Cited

U.S. PATENT DOCUMENTS

| | | | |
|---|---|---|---|
| 2014/0103627 A1* | 4/2014 | Deckard | B60G 3/202 |
| | | | 411/362 |
| 2015/0291225 A1* | 10/2015 | Yao | B62D 27/065 |
| | | | 29/525.02 |
| 2019/0071141 A1 | 3/2019 | Spindler et al. | |
| 2022/0024520 A1* | 1/2022 | Gaspar | F16F 13/14 |

* cited by examiner

ROLL CAGE JOINING APPARATUS AND METHOD

FIELD OF THE INVENTION

This application relates to roll cages, bumpers, roof racks, and other external frame members for vehicles and, more particularly, to approaches for joining sections of external frames of vehicles.

BACKGROUND OF THE INVENTION

Many vehicles incorporate roll cages to protect the driver of the vehicle. These may include racing vehicles, off road vehicles, sport utility vehicles, and all-terrain vehicles (ATVs) such as side-by-side utility vehicles. Where the roll cage is external to the vehicle, it is often advantageous to ship the vehicle with the roll cage detached from the vehicle in order to reduce shipping volume. To reduce shipping volume further, the roll cage may be modular such that it can be shipped in multiple pieces that are assembled to the vehicle and to one another at the destination.

It would be an advancement in the art to provide an improved approach for implementing a removable and modular roll cage.

SUMMARY OF THE INVENTION

In one aspect of the invention, an apparatus includes an intermediate member having a first shoulder portion and a second shoulder portion offset from one another along an axis, the first shoulder portion sized to insert within a first frame member and the second shoulder portion sized to insert within a second frame member. The intermediate member includes a central portion between the first shoulder portion and the second shoulder portion, the central portion having a larger extent outwardly from the axis than the first shoulder portion and the second shoulder portion. The intermediate member defines an intermediate aperture extending through the first shoulder portion, the central portion, and the second shoulder portion along the axis. A first insert is sized to insert within the first frame member, the first insert defining a first aperture that is threaded. A second insert is sized to insert in the second frame member and defines a second aperture, the second aperture and intermediate aperture being sized to receive a bolt configured to thread within the first aperture.

In some embodiments, the first shoulder portion has a first cylindrical outer surface centered on the axis, the second shoulder portion has a second cylindrical outer surface centered on the axis, and the central portion has a central outer surface that is cylindrical and centered on the axis. The central outer surface has a larger diameter than the first cylindrical outer surface and the second cylindrical outer surface.

In some embodiments, the first frame member is a first round tube and the second frame member is a second round tube. In some embodiments, an outer diameter of the central outer surface is substantially equal to an outer diameter of the first round tube and an outer diameter of the second round tube.

In some embodiments, the first frame member defines a plurality of first access holes, the first frame member being welded to the first insert through the plurality of first access holes. The second frame member defines a plurality of second access holes, the second frame member being welded to the second insert through the plurality of second access holes.

In some embodiments, one or more third frame members are secured to the intermediate member. The first frame member, second frame member, one or more third frame members, and the intermediate member may form a roll cage for a vehicle when fastened to one another.

In some embodiments, a method includes providing a first frame member and a second frame member. The method further includes providing a first intermediate member having a first right shoulder portion and a first left shoulder portion offset from one another along a first axis, the first right shoulder portion sized to insert within the first frame member and the first left shoulder portion sized to insert within the second frame member, the first intermediate member defining a first central portion between the first right shoulder portion and the first left shoulder portion, the first central portion having a larger extent outwardly from the first axis than the first left shoulder portion and the first right shoulder portion, the first intermediate member defining a first intermediate aperture extending through the first right shoulder portion, the first central portion, and the first left shoulder portion along the first axis.

The method may include providing a first insert sized to insert within the first frame member, the first insert defining a first aperture, the first aperture being threaded. The method may include providing a second insert sized to insert within the second frame member and defining a second aperture sized to receive a bolt configured to thread within the first aperture.

The method may include inserting the bolt through the second aperture, through the first intermediate aperture, and into the first aperture such that the bolt is threaded into the first aperture and secures the first insert, second insert, and intermediate member to one another. The method may include inserting the first right shoulder portion into the first frame member and inserting the first left shoulder portion into the second frame member.

The method may include welding the first insert within the first frame member offset from an end of the first frame member an amount substantially equal to a width of the first right shoulder portion along the first axis and welding the second insert within the second frame member offset from an end of the second frame member an amount substantially equal to a width of the first left shoulder portion along the first axis.

In some embodiments, the first right shoulder portion has a first cylindrical outer surface centered on the first axis, the first left shoulder portion has a second cylindrical outer surface centered on the first axis, the first central portion has a central outer surface that is cylindrical and centered on the first axis, the central outer surface having a larger diameter than the first cylindrical outer surface and the second cylindrical outer surface. The first frame member may be a first round tube and the second frame member may be a second round tube. An outer diameter of the central outer surface may be substantially equal to an outer diameter of the first round tube and an outer diameter of the second round tube.

In some embodiments, the first frame member defines a plurality of first access holes and the second frame member defines a plurality of second access hole. The method may further include welding the first frame member to the first insert through the plurality of first access holes; and welding the second frame member to the second insert through the plurality of second access holes.

In some embodiments there are one or more third frame members secured to the first intermediate member. The first frame member, second frame member, one or more third frame members, and the intermediate member may form a roll cage for a vehicle when fastened to one another. The method may include fastening the roll cage to the vehicle.

The method may include welding the first frame member to the first intermediate member and welding the second frame member to the first intermediate member.

In some embodiments, the method includes providing a third frame member. The method may further include providing a second intermediate member having a second right shoulder portion and a second left shoulder portion offset from one another along a second axis, the second right shoulder portion sized to insert within the third frame member and the second left shoulder portion sized to insert within the second frame member, the second intermediate member defining a second central portion between the second right shoulder portion and the second left shoulder portion, the first central portion having a larger extent outwardly from the second axis than the second left shoulder portion and the second right shoulder portion, the second intermediate member defining a second intermediate aperture extending through the second right shoulder portion, the second central portion, and the second left shoulder portion along the second axis.

The method may include providing a third insert secured within the first frame member and having a threaded shaft protruding outwardly from the second frame member. The method may include providing a fourth insert secured within the third frame member and defining a third aperture, the third aperture being threaded. The method may include inserting the threaded shaft through the second intermediate aperture and rotating the second frame member, third insert, and threaded shaft such that the threaded shaft is threaded into the third aperture.

In another aspect of the invention, an apparatus includes a first tube having a first insert secured therein, the first insert defining a first threaded aperture. The apparatus includes a second tube having a second insert and a third insert secured therein, the second insert being closer to a first end of the second tube than the third insert and the third insert being closer to a second end of the second tube opposite the first end of the second tube than the second insert, a threaded shaft being secured to the second insert and protruding outwardly from the first end of the second tube, the third insert defining a second threaded aperture. A third tube has a fourth insert secured therein, the fourth insert defining a third aperture. A first intermediate member defines a first intermediate aperture and a second intermediate member defines a second intermediate aperture. The second tube is joined to the first tube by the threaded shaft being positioned passing through the first intermediate aperture and being threaded into the first threaded aperture. The second tube is joined to the third tube by a bolt passing through the third aperture, the second intermediate aperture, and being threaded into the second threaded aperture.

The first intermediate member may include a first right shoulder, a first left shoulder, and a first central portion positioned between the first right shoulder and the first left shoulder, the first right shoulder being positioned within the first tube and the first left shoulder being positioned within the second tube, the first central portion being larger than inner diameters of the first and second tubes. The second intermediate member includes a second right shoulder, a second left shoulder, and a second central portion positioned between the second right shoulder and the second left shoulder, the second right shoulder being positioned within the second tube and the second left shoulder being positioned within the third tube, the second central portion being larger than inner diameters of the first and second tubes.

In some embodiments, the apparatus further includes one or more fourth tubes welded to the first intermediate member and one or more fifth tubes welded to the second intermediate member, the first tube, second tube, third tube, one or more fourth tubes, and one or more fifth tubes forming a roll cage of a vehicle.

In some embodiments, the apparatus includes a front row of seats and a rear row of seats, the first intermediate member being positioned closer to the front row of seats than the second intermediate member, the second intermediate member being positioned closer to the rear row of seats than the first intermediate member. The first tube, the second tube, the one or more fourth tubes, and one or more fifth tubes are fastened to a chassis of the vehicle.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1A:
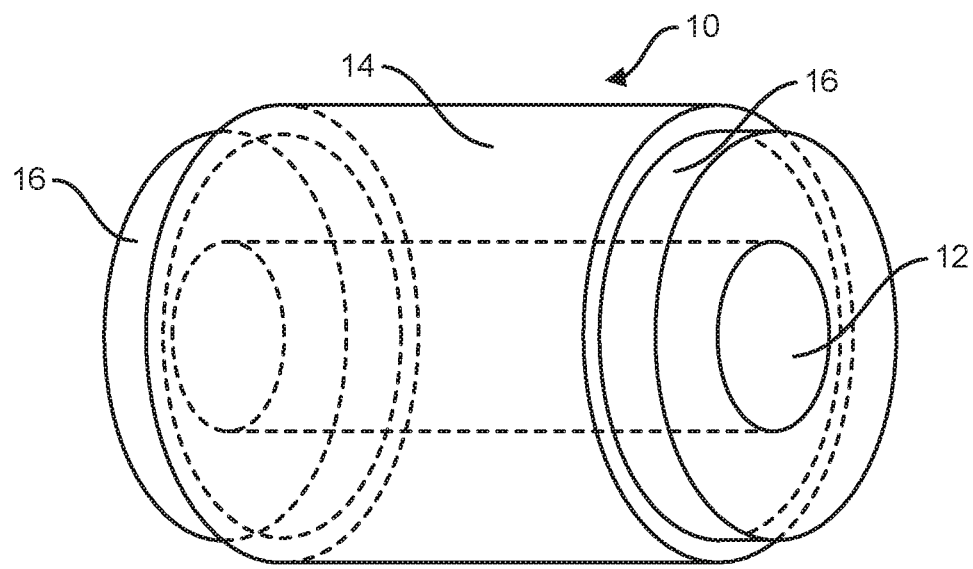
FIG. 1A is an isometric view of an intermediate member for joining tubes in accordance with an embodiment of the present invention.
Figure 1B:
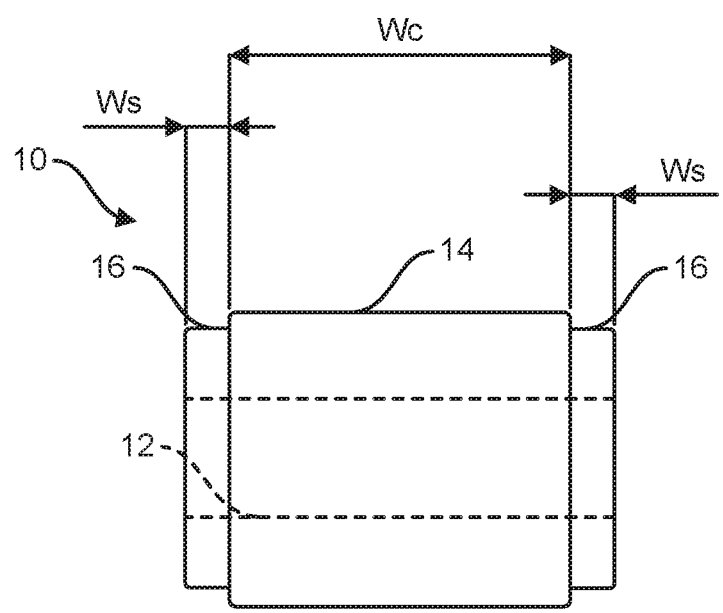
FIG. 1B is a side view of the intermediate member of FIG. 1A.

FIGS. 1A and 1B illustrate an intermediate member 10 that may be used to form a joint in a roll cage of a vehicle according to the approach described herein. The intermediate member 10 defines a central aperture 12, which may be cylindrical in shape. In the illustrated aperture, the central aperture 12 is smooth along its length, e.g. unthreaded, such that a bolt or other fastener may be passed therethrough without interference, i.e. manually.

The intermediate member 10 may include a central portion 14 that is cylindrical in shape with its axis of symmetry substantially (e.g., within 3 mm) centered on the axis of symmetry of the central aperture 12. Shoulder portions 16 may extend outwardly from the central portion 14 and likewise be cylindrical in shape with axes of symmetry substantially centered on the axis of symmetry of the central aperture 12 (unless otherwise noted, "substantially centered" shall be understood to be within 1 mm of centered). The shoulder portions 16 and central portion 14 may include chamfers or bevels machined therein. The shoulder portion 16 may be defined as a portions extending outwardly from the planar end faces of the central portion 14.

Note that in the following description the intermediate member 10 is described as being used to join round tubes such that the cylindrical shape of the central portion 14 and shoulder portions 16 conforms to the inner and outer shapes of these tubes. In other embodiments, tubes having square, rectangular, oval, octagonal, or other shapes may be used and the central portion 14 and shoulder portions 16 may be sized to conform to the outer and inner shapes of these tubes. Accordingly, references herein to cylindrical shapes may be understood to be replaceable with the any of the above-mentioned tube shapes.

The central portion 14 has a diameter perpendicular to its axis of symmetry that is larger than the diameter of the shoulder portions 16 perpendicular to their axes of symmetry. In general, the difference between the diameter of the central portion 14 and the diameter if the shoulder portions 16 may be equal to the wall thickness of the tubes (one half of a difference between tube outer diameter and tube inner diameter) being joined using the intermediate member 10 less some tolerance such that the shoulder portions 16 are insertable without substantial interference, e.g. 0.5 to 3 mm. Alternatively, an interference fit may be desired such that the tolerance is smaller or zero.

As shown in FIG. 1B, the shoulders have widths Ws measured along the axis of the center aperture 12 that may be substantially equal, though unequal widths Ws are also possible. The central portion 14 has a width Wc along the axis of the center aperture that is much larger than the widths Ws. As is apparent, the width Ws may be defined as a width between a face of the shoulder perpendicular to the axis and a face of the central portion 14 perpendicular to the axis.

Figure 2:
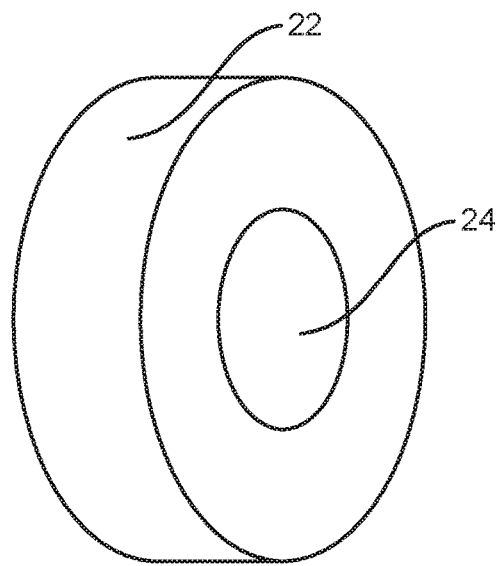
FIG. 2 is an isometric view of an unthreaded insert for securing to a tube of the roll cage in accordance with an embodiment of the present invention.

Referring to FIG. 2, an insert 22 may be used in combination with the intermediate member 10. The insert 22 may have a cylindrical outer surface with a diameter substantially equal to the outer diameter of the shoulders 16 (unless otherwise noted, "substantially equal" in this document shall be understood to be within 3 mm of equal). The insert 22 likewise defines a central aperture 24 that may be cylindrical with an inner diameter substantially equal to the inner diameter of the central aperture 12. The axes of symmetry of the outer surface and the central aperture may be substantially centered on one another. The central aperture 24 may be smooth, i.e. not threaded. In other embodiments, the central aperture 24 is threaded.

As is apparent in FIG. 2, the width of the insert 22 parallel to the axis of symmetry of the cylindrical outer surface may be substantially smaller than the width of the intermediate member 10 parallel to the axis of symmetry of its cylindrical outer surface. However, in other embodiments, the widths may be the same or the width of insert 22 is larger than the width of the intermediate member 10. The width of the insert 22 may be defined as the space between faces of the insert 22 that are perpendicular to the axis of symmetry. For example, the width of the insert 22 may be between 10 and 25 percent of the width of the intermediate member 10. Defined differently, the width of the insert 22 may be less than 50 percent, preferably between 20 and 50 percent, of its outer diameter whereas the width Wc of the central portion 14 of the intermediate member is equal to or greater than its diameter.

Figure 3:
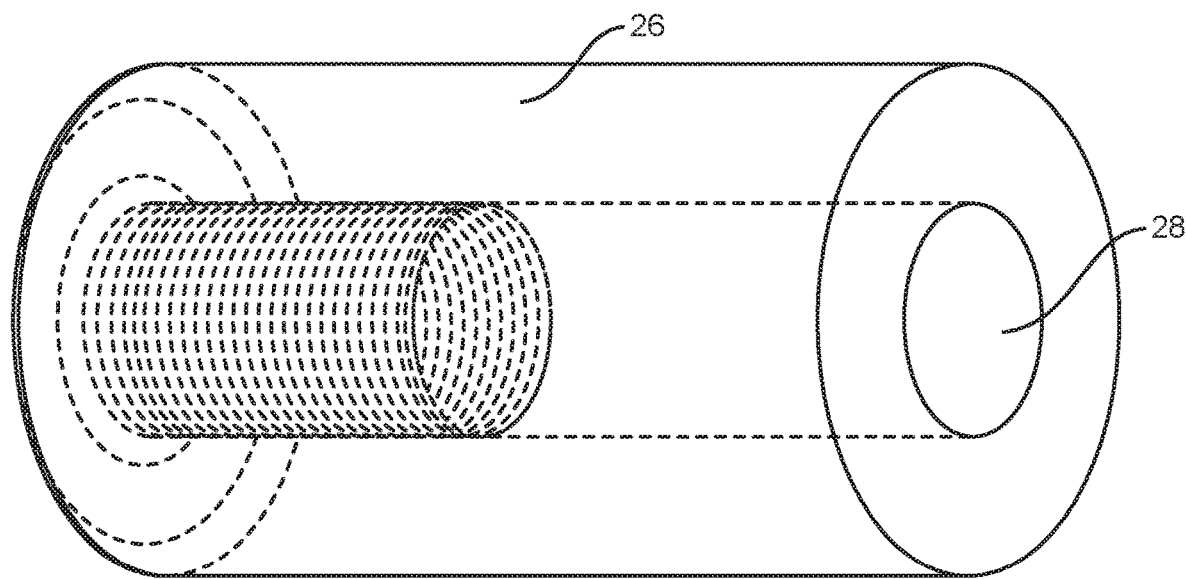
FIG. 3 is an isometric view of a threaded insert for securing to another tube of the roll cage in accordance with an embodiment of the present invention.

Referring to FIG. 3, a second insert 26 may also be used in combination with the insert 22 and the intermediate member 10 in order to form a roll cage joint. The second insert 26 may have an outer surface that is cylindrical and has a diameter substantially equal to the outer diameter of the insert 22 and the shoulders 16. The second insert 26 defines a central aperture 28 that is substantially centered on the axis of symmetry of the cylindrical outer surface. The central aperture 28 extends from one side of the insert 26 either partially through the insert 26 or completely through the insert 26. The aperture 28 may be threaded along all or part of its length, e.g., between 2 and 5 cm or between 10 and 50 percent of a width of the central aperture 28 along its axis.

The outer diameter of a bolt sized to thread within the threaded portion may be smaller than the diameter of the central apertures 12 and 24 such that the shaft of a threaded bolt may be passed through the insert 12 and the intermediate member 10 and engaged with the thread portion such that the insert 22 and intermediate member 10 are captured between the insert 26 and a head of the bolt.

To provide sufficient length for adequate thread engagement, the insert 26 may be wider than the insert 22 along its axis of symmetry, e.g. between faces perpendicular to the axis of symmetry, such as between 5 and 10 times wider. The insert 26 may also be wider than the intermediate member 10, such as between 10 and 50 percent wider.

Figure 4:
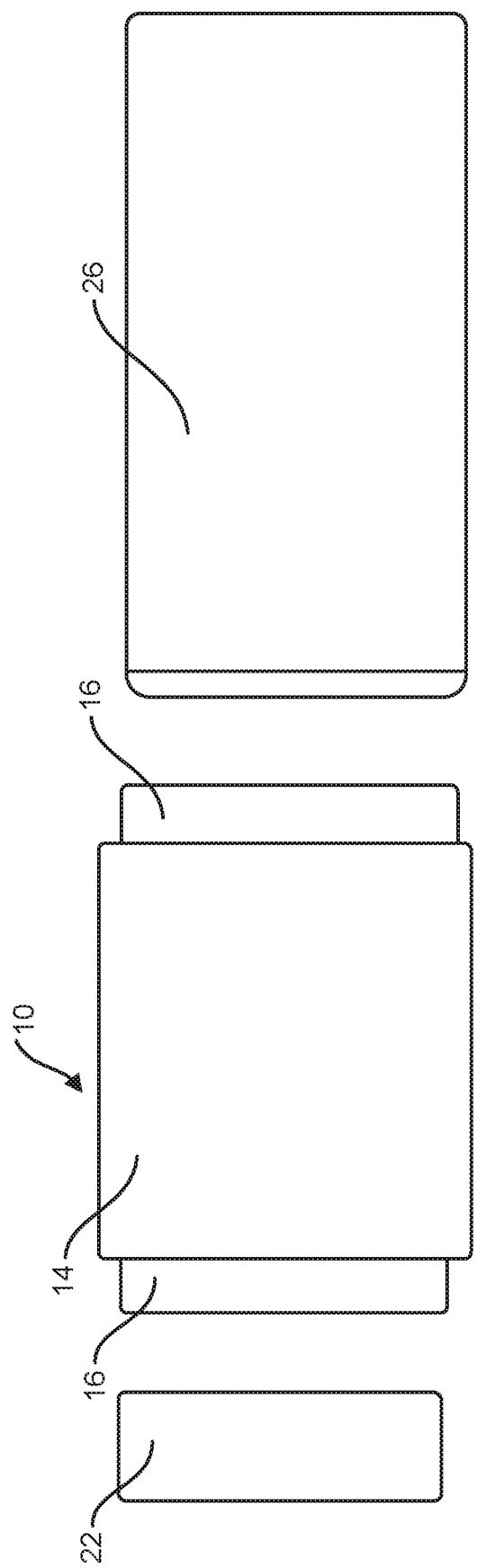
FIG. 4 is a disassembled view of the unthreaded insert, intermediate member, and threaded insert in accordance with an embodiment of the present invention.

Referring to FIGS. 4 and 5, the insert 22, intermediate member 10, and insert 26 may be used in the illustrated arrangement. The insert 22 is secured within a first tube 30 and the insert 26 is secured within a second tube 32. Securing may be performed by means of welding or other securement means.

Figure 5A:
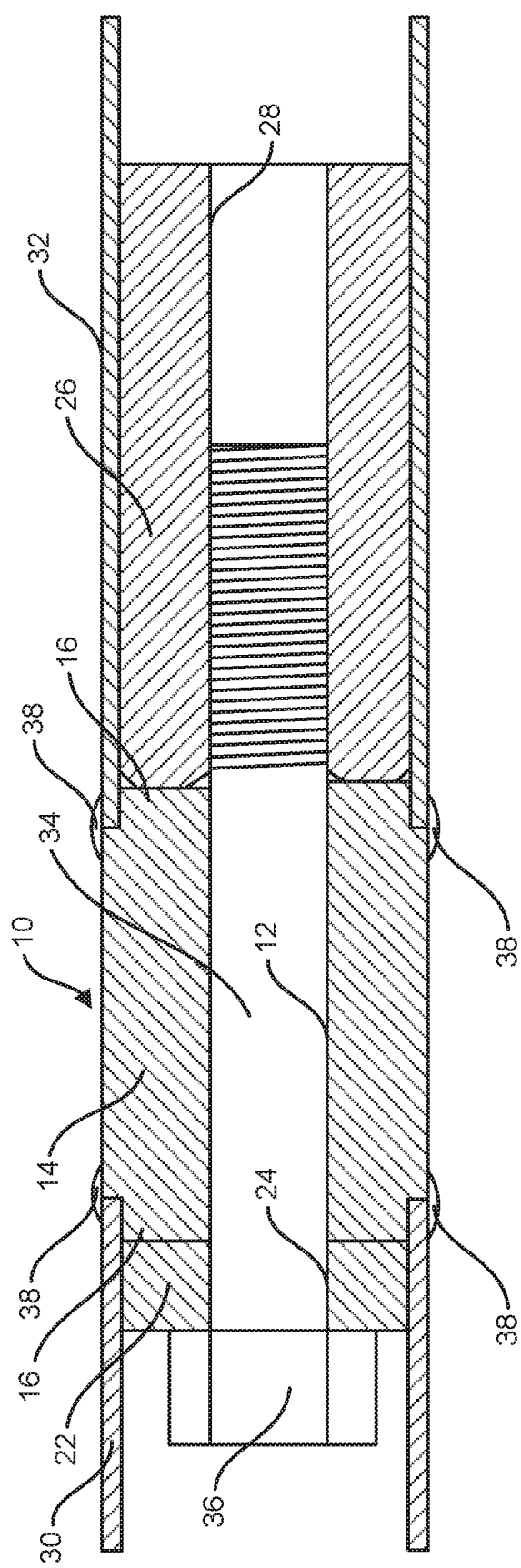
FIG. 5A is a cross-sectional view illustrating the unthreaded insert, intermediate member, and threaded insert securing the tubes to one another in accordance with an embodiment of the present invention.

As is apparent in FIG. 5A, when assembled, the shoulders 16 of the intermediate member 10 may insert within the tubes 30, 32. Accordingly, the inserts 22 and 26 may be secured within the tubes 30, 32, respectively, offset from the ends of the tubes 30, 32 by an amount substantially equal to the width Ws of the shoulders 16. Accordingly, with the inserts 22, 26 in place within the tubes 30, 32, the shoulders 16 may be inserted within the tubes 30, 32 such that the ends of the tubes 30, 32 abut the central portion 14 or are within 0.5 and 1 mm of the center portion 14. In this position, the ends of the intermediate member 14 may abut the inserts 22, 26 or may be offset by a gap, e.g., between 0.5 and 1 mm.

A bolt shaft 34 is passed through the central apertures 24, 12 and is threaded into the central aperture 28 until the head 36 of the bolt is pressing against the insert 22 and maintaining the position of the insert 22, intermediate member 10, and insert 26 relative to one another.

Once the bolt shaft 34 is in place and tightened, additional securement means may be used. For example, welds 38 may be made around the boundary between the tube 30 and the central portion 14 and the boundary between the tube 32 and the central portion 14 as shown in FIG. 6.

Figure 5B:
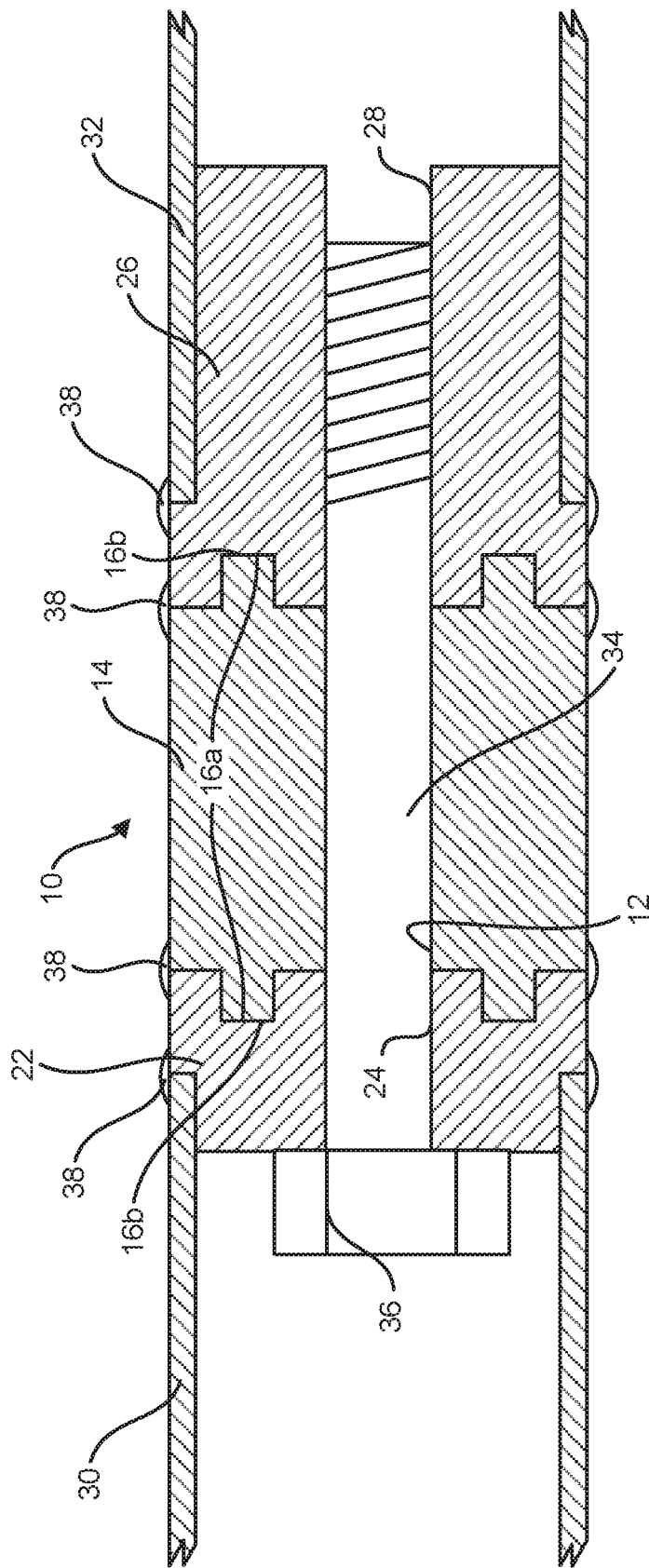
FIG. 5B is a cross sectional view illustrating an alternative embodiment for the unthreaded insert, intermediate member, and threaded insert in accordance with an embodiment of the present invention.

FIG. 5B illustrates alternative embodiments for the insert 20 includes a portion having an outer diameter substantially equal to that of the tube 30 within which it inserts and which abuts the end of the tube 30 when the insert 20 is mounted to the tube 30. The insert 26 likewise includes a portion having an outer diameter substantially equal to that of the tube 32 within which it inserts and which abuts the end of the tube 32 when the insert 26 is inserted within the tube 32. The inserts 20, 26 may be secured to the tubes 30, 32 by means of additional welds 38.

In the illustrated embodiment, the intermediate member 10 includes shoulders 16a embodied as annular, e.g., cylindrical rigs, protruding outwardly from faces of the central portion 14. The insert 22 and insert 26 each include annular grooves 16b, e.g. cylindrical grooves, that are sized to receive the shoulders 16a. The grooves 16b may receive the shoulders 16a by means of a slip fit or an interference fit. For example, tightening of the bolt 34, 36 may force the shoulders 16a into the grooves 16b and overcome friction between the shoulders 16a and grooves 16b.

Figure 6:
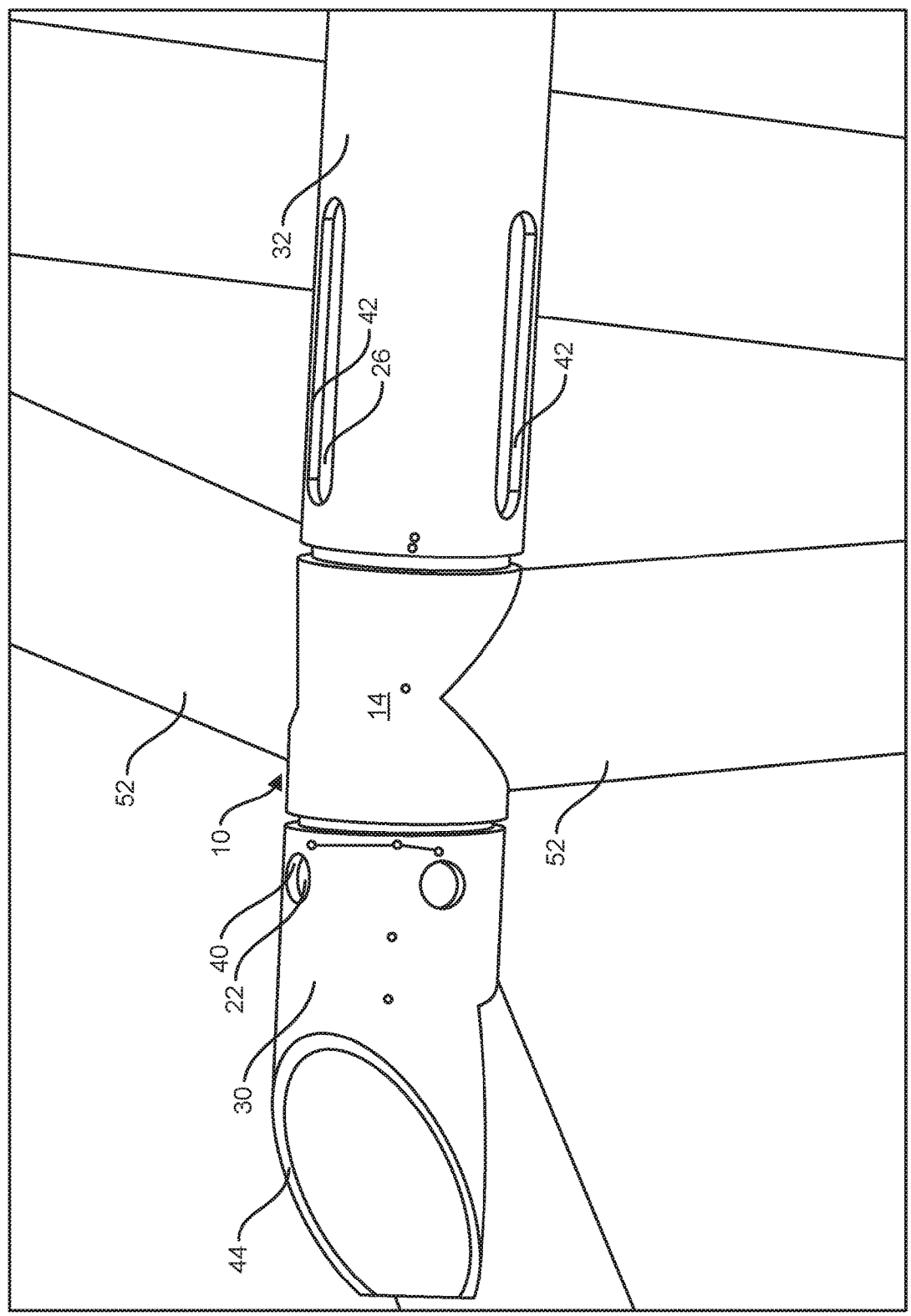
FIG. 6 is an isometric view showing a roll cage joint formed in accordance with an embodiment of the present invention.

Referring to FIG. 6, securement of the inserts 22, 26 within the tubes 30, 32 may be achieved by means of openings 40, 42 distributed circumferentially around the tubes 30, 32. For example, there may be between 2 and 6, preferably four openings 40, 42 on the tubes 30, 32. The openings 40, 42 may be distributed uniformly, i.e. the angular separations between openings around the circumference being within 5 degrees of equal to one another. As is apparent in FIG. 7, the openings 42 in the tube 32 may be longer, e.g., between 5 and 10 times longer, corresponding to the increased length of the insert 26. The openings 40, 42 may be round or oblong.

The openings 40, 42 provide access to weld the inserts 22, 26 within the tubes 30, 32. Accordingly, in use, the inserts 22, 26 are welded into place within the tubes 30, 32 through the openings 40, 42. The tubes 30, 32 and intermediate member 10 may then be brought into the relative position shown in FIG. 6 and secured in place with the bolt shaft 34. Alternatively, the inserts 22, 26 may be welded into the tubes 30, 32 without the use of openings 40, 42. For example, inserts 22, 26 may be welded to inner surfaces of the tubes 30, 32.

FIG. 6 further illustrates that an end 44 of the tube 30 may be sufficiently close to the insert 22 that the bolt shaft 34 may be inserted and a socket wrench engaged with the bolt head 36 in order to secure it in place. In the illustrated embodiment, the end 44 is cut at an angle of between 30 and 60 degrees and is oriented such that the face of the cut is oriented upward. Other angles of the end 44, including 0 degrees (straight perpendicular cut) may also be used depending on the vehicle configuration or the application in which the fastening system is used.

Figure 7:
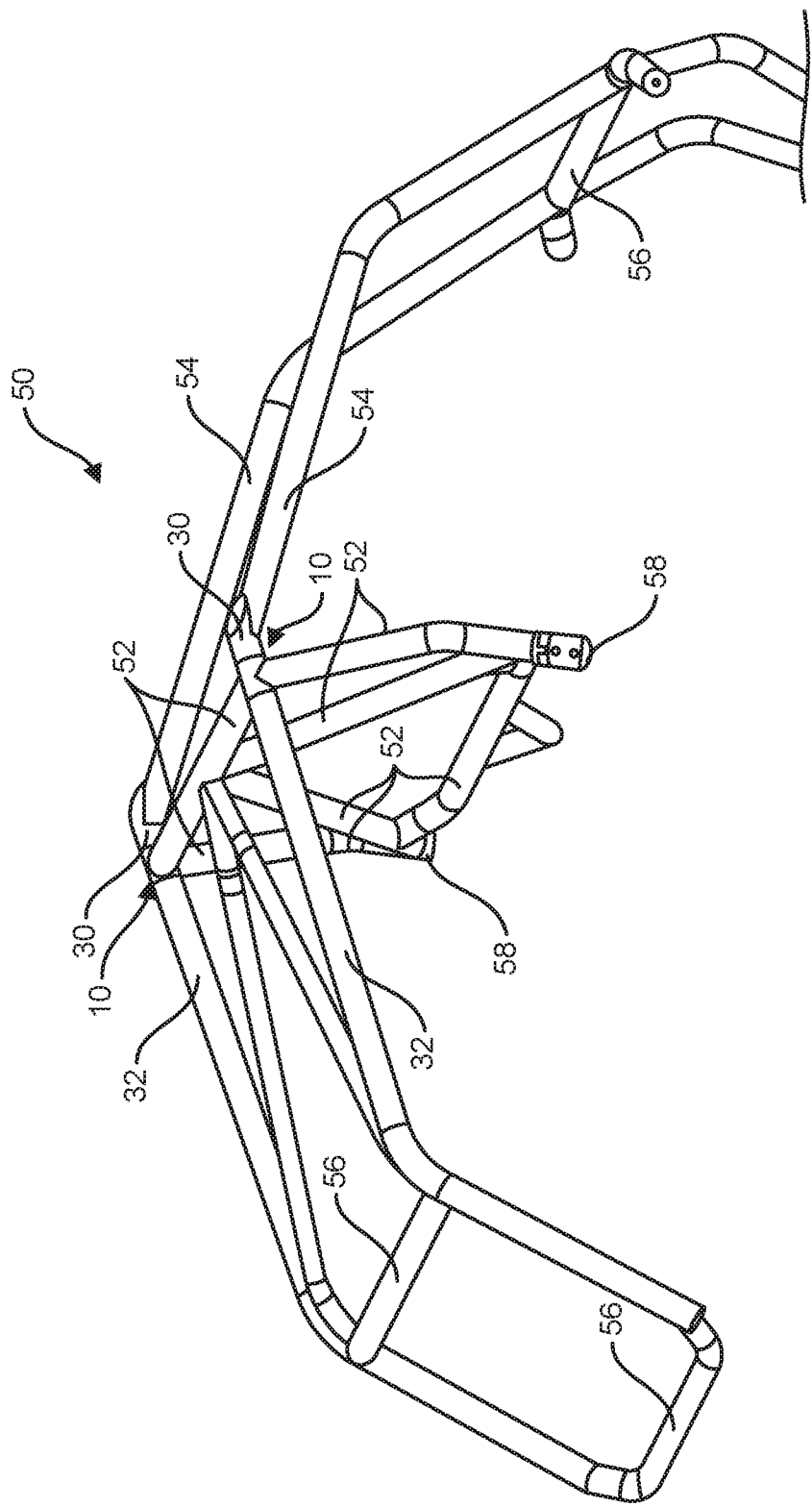
FIG. 7 is an isometric view of a roll cage incorporating roll cage joints formed in accordance with an embodiment of the present invention.

Referring to FIG. 7 while still referring to FIG. 6, a roll cage 50 may include one or more joints formed as described above with respect to FIGS. 1 through 6. In particular, the illustrated roll cage 50 may include tubes 52 that are generally co-planar and define a "wall" that is positioned behind the front seats of the vehicle in order to provide a rigid structure that resists collapse in the event of a rollover. In some embodiments, the tubes 52 are coplanar such that two parallel planes may be defined that are separated by no more than three times the maximum outer diameter of the tubes 52, preferably no more than two times, such that the tubes 52 are entirely located between the two planes.

In the illustrated embodiment, the tubes 52 are welded to one or more intermediate members 10. In the illustrated embodiment, there are two intermediate members 10 on either side of the vehicle. Two tubes 32 secure to the intermediate members 10 as described above and project forwardly from the tubes 52. Two tubes 30 secure to the intermediate members 10 and project rearwardly. In the illustrated embodiment, a rearwardly projecting tube 54 secures to an underside of each the tube 30 in such a way that the end 44 remains open and accessible for insertion of the bolt shaft 34 as described above. Note that in some embodiments, a single tube 30 and/or single tube 32 and tube 54 may be sufficient. Likewise, more than two tubes 30 and/or more than two tubes 32 and tubes 54 may be used in other applications.

The roll cage 50 may include other structures known in the art such as one or more cross tubes 56 extending between pairs of tubes 32 or tubes 54. Likewise, the tubes 52, and possibly the tubes 54, 56, may define attachment structures 58 for securing to the chassis of a vehicle. The configuration of the attachment structures 58 and their positions relative to one another may be according to any approach known in the art. However, in general, the intermediate members 10 are secured to a topmost tube of the tubes 52 whereas the attachment structures 58 secured to tubes are secured at or near the bottom of the tubes 52, e.g. within 20 cm, preferably within 10 cm. Note further that the orientation of the roll cage 50 may also be reversed relative to the vehicle, i.e. rearwardly tubes 30, 54 projecting forwardly and tubes 32 projecting rearwardly.

Figure 8:
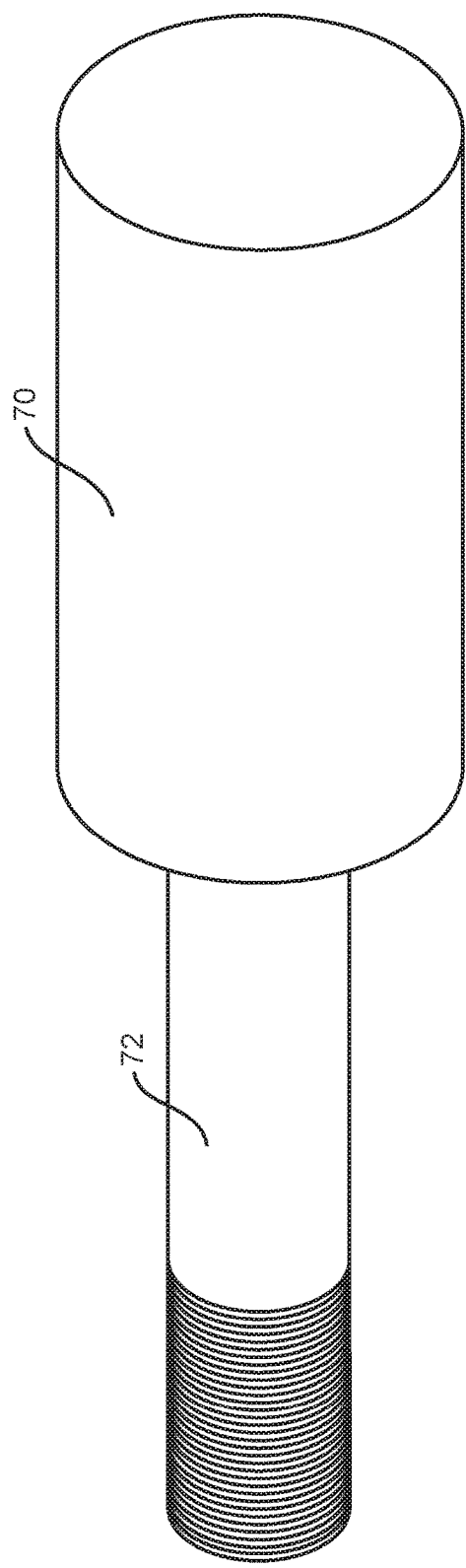
FIG. 8 is an isometric view of an insert with a threaded shaft in accordance with an embodiment of the present invention.
Figure 9:
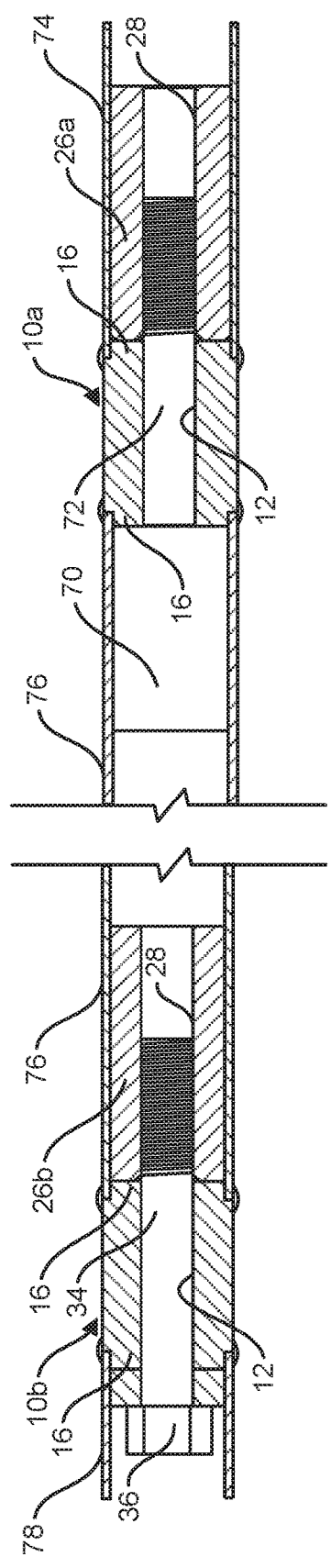
FIG. 9 is a cross-sectional view of the insert and threaded shaft used to form a roll cage joint in accordance with an embodiment of the present invention.
Figure 10:
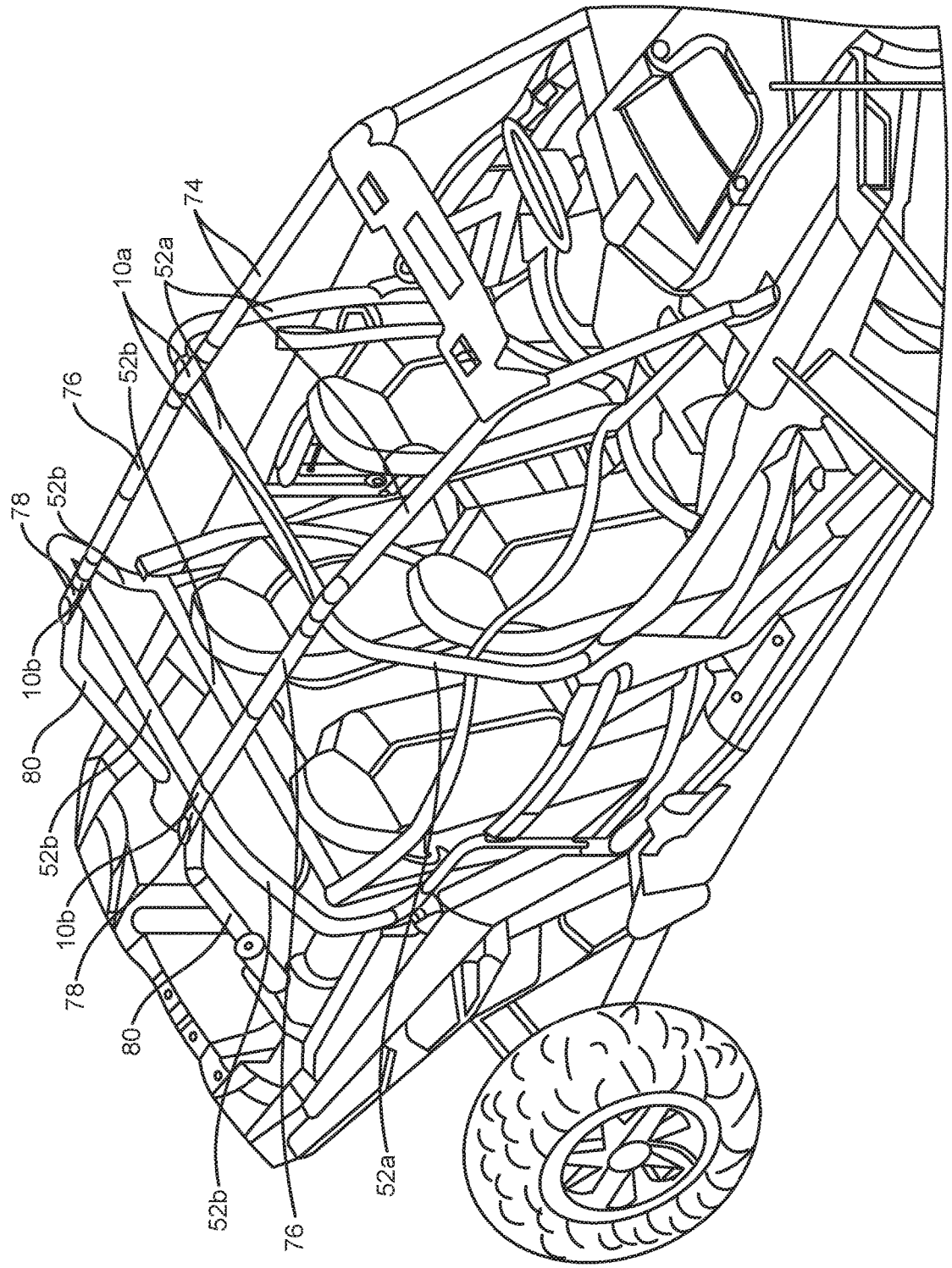
FIG. 10 is an isometric view of a roll cage incorporating the roll cage joint of FIG. 6 and the roll cage joint of FIG. 9 in accordance with an embodiment of the present invention.

FIGS. 8, 9, and 10 illustrate an approach for implementing a roll cage for a vehicle with multiple rows of seats such that there are multiple "walls" of tubes that need to be secured to the wall cage for each row of seats.

Referring specifically to FIG. 8, an insert 70 may have a cylindrical outer surface substantially equal in diameter to the outer diameters of the inserts 22, 26 and shoulders 16. The insert 70 may have a width along the axis of symmetry of the cylindrical outer surface that is substantially equal to that of the insert 26, however non-equal widths may be used in other embodiments. From one end of the insert 70 protrudes a shaft 72, at least a portion of which is threaded. The shaft 72 protrudes parallel to the axis of symmetry of the cylindrical outer surface of the insert 70 and may be concentric with the cylindrical outer surface.

FIG. 9 illustrates an example use of the insert 70. In particular, the insert 70 may be used in combination with two instances 10a, 10b of the intermediate member 10, two instances 26a, 26b of the insert 26, and one instance of the insert 22. These components may be used to join three tubes 74, 76, and 78. The tube 74 receives insert 26a that is welded thereto as described above, i.e. the tube 74 may be provided with openings 42 through which the insert 26a is welded within the tube 74 (see FIG. 6). As for other embodiments, the insert 26a may be positioned offset inwardly from the end of the tube 74 by an amount substantially equal to the width Ws of a shoulder 16 of the intermediate member 10a.

The insert 70 may be secured at a first end of the tube 76 offset inwardly from the first end of the tube 74 by an amount substantially equal to the width Ws of a shoulders 16 of the intermediate member 10 with the threaded shaft 72 protruding outwardly from the first end. The insert 70 may be welded to the tube 76. For example, the tube 76 may be provided with openings. 42 as described above through which the insert 70 may be welded to the tube 76.

In one method of assembly, the threaded shaft 72 is inserted through the intermediate member 10a and into or adjacent the aperture 28 of the insert 26a. The tube 76 and insert 70 are then twisted in order to thread the shaft 72 into the aperture 28. The shaft 72 may be threaded into the aperture 28, such that the shoulders 16 of the intermediate member 10a are inserted within the tubes 74, 76 and the tension on the shaft 72 maintains the relative position of the tubes 74, 76 on either side of the intermediate member 10a. Turning of the tube 76, insert 70, and shaft 72 may be accomplished by initially manually grasping and rotating the tube 76. Additional torque to tension the shaft 72 may be applied using wrench or other tool, such as a spanner wrench. For example, the spanner wrench may hook into one or more of the openings 42 on the tube 76 in order to apply torque. In some embodiments, additional openings specifically sized and positioned for engaging with a spanner wrench may be formed in the tube 76.

The insert 26b may be secured within the tube 76 at the second end of the tube 76 and may be offset inwardly from the second end by an amount substantially equal to the width Ws of a shoulder 16 of the intermediate member 10b. The insert 26b may be secured within the tube 76 by means of additional openings 42 through which the insert 26b is welded within the tube 76. The insert 22 may be secured, e.g., welded, within the tube 78 and offset from one end by an amount substantially equal to a width Ws of a shoulder 16 of the intermediate member 10b as described above with respect to FIGS. 1 through 5. The threaded shaft 34 of a bolt may then be inserted through the aperture 24 of the insert 22, through the central aperture 12 of the intermediate member 10, and into the aperture 28 of the insert 26b. The shaft 34 may then be threaded into the aperture 28 in order to tension the shaft 34 such that the intermediate member 10b and insert 22 are clamped between the insert 22 and the insert 26b.

FIG. 10 illustrates an example application for the joining approach of FIGS. 8 and 9. In this example, there are two intermediate members 10a and two intermediate members 10b. There are two forwardly extending tubes 74 that secure to the intermediate members 10a as described above and are also secured to a forward portion of the vehicle, i.e. forward of the front seats and steering wheel. There are two middle tubes 76 that are each secured to one intermediate member 10a and one intermediate member 10b. The middle tubes 76 may extend over the rear seats of the vehicle, i.e. the row of seats behind the front seats of the vehicle.

The intermediate members 10a may be welded to one or more tubes 52a that form a vertical support of the roll cage. The one or more tubes 52a may be mounted to the chassis of the vehicle such that they extend upwardly between the front and rear rows of seats of the vehicle. The intermediate members 10b may be welded to one or more tubes 52b that form a second vertical support of the roll cage. The one or more tubes 52b may be mounted to the chassis of the vehicle, such as behind the rear row of seats.

Tubes 78 secure to the intermediate members 10b as described above and may be short sections with open ends permitting insertion of the bolt shaft 34. In particular, the tubes 78 may be cut an angle as described above with respect to the tube 30 and another rearwardly extending tube 80 may be welded below each tube 78 and extend rearwardly and/or downwardly to a point of securement to the chassis of the vehicle.

The roll cage of FIG. 10 may be assembled by first securing the tubes 74, tubes 52a, tubes 52b, and tubes 80 to the chassis of the vehicle, the intermediate members 10a, 10b already being welded to the tubes 52a, 52b, respectively. The tubes 76 may be secured to the tubes 74 using intermediate members 10a as described above with respect to FIG. 10. The tubes 78 fastened to the tubes 80 may then be secured to the tubes 76 using intermediate members 10b as described above with respect to FIG. 10. The joints of the tubes 74, 76, 78 to the intermediate members 10a, 10b may then be welded in the same manner as described above with respect FIG. 6. In an alternative approach, the tubes 74, 76, 78 are fastened to one another using the intermediate members 10a, 10b while separate from the vehicle and then the complete roll cage is fastened to the vehicle.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

The invention claimed is:

1. An apparatus comprising:
   an intermediate member having a first shoulder portion and a second shoulder portion offset from one another along an axis, the first shoulder portion sized to insert within a first frame member and the second shoulder portion sized to insert within a second frame member, the intermediate member defining a central portion between the first shoulder portion and the second shoulder portion, the central portion having a larger extent outwardly from the axis than the first shoulder portion and the second shoulder portion, the intermediate member defining an intermediate aperture extending through the first shoulder portion, the central portion, and the second shoulder portion along the axis;
   a first insert sized to insert within the first frame member, the first insert defining a first aperture, the first aperture being threaded; and
   a second insert sized to insert within the second frame member and defining a second aperture, the second aperture and intermediate aperture being sized to receive a bolt configured to thread within the first aperture.

2. The apparatus of claim 1, wherein the first shoulder portion has a first cylindrical outer surface centered on the axis, the second shoulder portion has a second cylindrical outer surface centered on the axis, the central portion has a central outer surface that is cylindrical and centered on the axis, the central outer surface having a larger diameter than the first cylindrical outer surface and the second cylindrical outer surface.

3. The apparatus of claim 2, further comprising the first frame member and the second frame member, the first frame member being a first round tube and the second frame member being a second round tube.

4. The apparatus of claim 3, wherein an outer diameter of the central outer surface is substantially equal to an outer diameter of the first round tube and an outer diameter of the second round tube.

5. The apparatus of claim 3, wherein:
   the first frame member defines a plurality of first access holes, the first frame member being welded to the first insert through the plurality of first access holes;
   the second frame member defines a plurality of second access holes, the second frame member being welded to the second insert through the plurality of second access holes.

6. The apparatus of claim 1, further comprising one or more third frame members secured to the intermediate member.

7. The apparatus of claim 6, wherein the first frame member, second frame member, one or more third frame members, and the intermediate member form a roll cage for a vehicle when fastened to one another.

8. A method comprising:
providing a first frame member and a second frame member;
providing a first intermediate member having a first right shoulder portion and a first left shoulder portion offset from one another along a first axis, the first right shoulder portion sized to insert within the first frame member and the first left shoulder portion sized to insert within the second frame member, the first intermediate member defining a first central portion between the first right shoulder portion and the first left shoulder portion, the first central portion having a larger extent outwardly from the first axis than the first left shoulder portion and the first right shoulder portion, the first intermediate member defining a first intermediate aperture extending through the first right shoulder portion, the first central portion, and the first left shoulder portion along the first axis;
providing a first insert sized to insert within the first frame member, the first insert defining a first aperture, the first aperture being threaded;
providing a second insert sized to insert within the second frame member and defining a second aperture sized to receive a bolt configured to thread within the first aperture;
inserting the bolt through the second aperture, through the first intermediate aperture, and into the first aperture such that the bolt is threaded into the first aperture and secures the first insert, second insert, and intermediate member to one another.

9. The method of claim 8, further comprising inserting the first right shoulder portion into the first frame member and inserting the first left shoulder portion into the second frame member.

10. The method of claim 9, further comprising welding the first insert within the first frame member offset from an end of the first frame member an amount substantially equal to a width of the first right shoulder portion along the first axis and welding the second insert within the second frame member offset from an end of the second frame member an amount substantially equal to a width of the first left shoulder portion along the first axis.

11. The method of claim 9, wherein:
the first right shoulder portion has a first cylindrical outer surface centered on the first axis, the first left shoulder portion has a second cylindrical outer surface centered on the first axis, the first central portion has a central outer surface that is cylindrical and centered on the first axis, the central outer surface having a larger diameter than the first cylindrical outer surface and the second cylindrical outer surface;
the first frame member is a first round tube and the second frame member is a second round tube; and
an outer diameter of the central outer surface is substantially equal to an outer diameter of the first round tube and an outer diameter of the second round tube.

12. The method of claim 11, wherein the first frame member defines a plurality of first access holes and the second frame member defines a plurality of second access holes, the method comprising:
welding the first frame member to the first insert through the plurality of first access holes; and
welding the second frame member to the second insert through the plurality of second access holes.

13. The method of claim 8, wherein one or more third frame members are secured to the first intermediate member, the first frame member, second frame member, one or more third frame members, and the intermediate member forming a roll cage for a vehicle when fastened to one another, the method further comprising securing the roll cage to the vehicle.

14. The method of claim 8, further comprising welding the first frame member to the first intermediate member and welding the second frame member to the first intermediate member.

15. The method of claim 8, further comprising:
providing a third frame member;
providing a second intermediate member having a second right shoulder portion and a second left shoulder portion offset from one another along a second axis, the second right shoulder portion sized to insert within the third frame member and the second left shoulder portion sized to insert within the second frame member, the second intermediate member defining a second central portion between the second right shoulder portion and the second left shoulder portion, the first central portion having a larger extent outwardly from the second axis than the second left shoulder portion and the second right shoulder portion, the second intermediate member defining a second intermediate aperture extending through the second right shoulder portion, the second central portion, and the second left shoulder portion along the second axis;
providing a third insert secured within the first frame member and having a threaded shaft protruding outwardly from the second frame member;
providing a fourth insert secured within the third frame member and defining a third aperture, the third aperture being threaded;
inserting the threaded shaft through the second intermediate aperture and rotating the second frame member, third insert, and threaded shaft such that the threaded shaft is threaded into the third aperture.

16. An apparatus comprising:
a first tube having a first insert secured therein, the first insert defining a first threaded aperture;
a second tube having a second insert and a third insert secured therein, the second insert being closer to a first end of the second tube than the third insert and the third insert being closer to a second end of the second tube opposite the first end of the second tube than the second insert, a threaded shaft being secured to the second insert and protruding outwardly from the first end of the second tube, the third insert defining a second threaded aperture;
a third tube having a fourth insert secured therein, the fourth insert defining a third aperture;
a first intermediate member defining a first intermediate aperture; and
a second intermediate member defining a second intermediate aperture;
wherein, the second tube is joined to the first tube by the threaded shaft being positioned passing through the first intermediate aperture and being threaded into the first threaded aperture; and
wherein the second tube is joined to the third tube by a bolt passing through the third aperture, the second intermediate aperture, and being threaded into the second threaded aperture.

17. The apparatus of claim 16, wherein:
the first intermediate member includes a first right shoulder, a first left shoulder, and a first central portion positioned between the first right shoulder and the first left shoulder, the first right shoulder being positioned within the first tube and the first left shoulder being positioned within the second tube, the first central portion being larger than inner diameters of the first and second tubes
the second intermediate member includes a second right shoulder, a second left shoulder, and a second central portion positioned between the second right shoulder and the second left shoulder, the second right shoulder being positioned within the second tube and the second left shoulder being positioned within the third tube, the second central portion being larger than inner diameters of the first and second tubes.

18. The apparatus of claim 16, further comprising one or more fourth tubes welded to the first intermediate member and one or more fifth tubes welded to the second intermediate member, the first tube, second tube, third tube, one or more fourth tubes, and one or more fifth tubes forming a roll cage of a vehicle.

19. The apparatus of claim 18, further comprising the vehicle, the vehicle comprising a front row of seats and a rear row of seats, the first intermediate member being positioned closer to the front row of seats than the second intermediate member, the second intermediate member being positioned closer to the rear row of seats than the first intermediate member.

20. The apparatus of claim 19, wherein the first tube, the second tube, the one or more fourth tubes, and one or more fifth tubes are fastened to a chassis of the vehicle.

* * * * *